United States Patent [19]

Sugahara

[11] 3,926,074
[45] Dec. 16, 1975

[54] RESONANCE PREVENTIVE SYSTEM FOR POWER TRANSMISSION SYSTEMS OF INTERNAL COMBUSTION ENGINES

[75] Inventor: Eisuke Sugahara, Tokyo, Japan

[73] Assignee: Nippon Piston Ring Co., Ltd., Tokyo, Japan

[22] Filed: Mar. 27, 1974

[21] Appl. No.: 455,086

[30] Foreign Application Priority Data
Mar. 27, 1973   Japan.................................. 48-35203

[52] U.S. Cl................ 74/857; 74/752 A; 74/752 C; 192/103 F; 192/104 F; 64/26
[51] Int. Cl.²................., B60K 21/00; F16D 23/10; F16D 3/80
[58] Field of Search............. 74/752 A, 752 C, 857; 64/26, 27 R; 192/104 F, 103 F, 82 T

[56] References Cited
UNITED STATES PATENTS

| | | | |
|---|---|---|---|
| 2,929,231 | 3/1960 | Bank.................... | 64/26 X |
| 2,995,957 | 8/1961 | Wilson et al. ............... | 192/103 F X |
| 3,259,220 | 7/1966 | Roper.......................... | 192/103 F X |
| 3,407,912 | 10/1968 | Moore.......................... | 192/104 F X |
| 3,545,584 | 12/1970 | Takata.......................... | 192/103 F X |
| 3,598,211 | 8/1971 | Fergle........................... | 192/103 F X |

Primary Examiner—Samuel Scott
Assistant Examiner—P. S. Lall
Attorney, Agent, or Firm—Sughrue, Rothwell, Mion, Zinn & Macpeak

[57] ABSTRACT

Herein disclosed is a resonance preventive system for use with a power transmission system of an internal combustion engine. The resonance preventive system comprises a fluid coupling with variable torsional rigidity disposed midway of the power transmission system, a detector for detecting operation conditions of the engine in terms of its RPM and/or its applied load for producing a signal indicative of the operating conditions, and a control responsive to the signal of the detector for supplying a fluid control signal, which has its pressure and flow rate varied in accordance with the engine operating conditions, to the fluid coupling so that the resonance point of the power transmission system may be shifted in response to the variation in the engine operating conditions.

6 Claims, 6 Drawing Figures

RESONANCE PREVENTIVE SYSTEM FOR POWER TRANSMISSION SYSTEMS OF INTERNAL COMBUSTION ENGINES

BACKGROUND OF THE INVENTION

1. Field of the invention

The present invention relates to a power transmission system for an internal combustion engine, and more particularly to a resonance preventive system for use with the power transmission system of the above type.

2. Description of the prior art

Design of an internal combustion engine, especially of a marine engine has been almost devoted to obviation of resonance of its power transmission system which may invite a fatal accident. Thus, the resonance of the transmission system is one of the major problems in the marine field.

For example, when a propeller shaft is running at an operating point close to its resonance point, breakage of a gear of a reduction mechanism, or still worse, breakage of the propeller shaft itself will invite a marine disaster. Therefore, calculation of oscillation of the transmission system of the marine engine has been conducted as a countermeasure so that the transmission system may be so designed as to have its normal operating range shifted away from the resonance point. This design is usually subject to considerable restriction, and as such it cannot be a sufficient countermeasure for the resonance problem.

In case of a middle or small marine engine, the output power is taken off, not only through the propeller shaft, but also through another output shaft which is installed in front of the engine. The latter is known as a front P.T.O. (power take-off) through which the output power is partially taken out to drive a fishery machine. In this application, the engine is made to run at a quarter to half of the rated RPM.

In order to obviate the resonance problems, as described above, by shifting sufficiently the resonance point of a particular marine engine, one existing countermeasure is to accomplish readjustment by varying the mass of a flywheel and/or the diameter of the propeller shaft. However, this countermeasure is not a sufficiently effective answer for the resonance problems, and a highly flexible coupling is added to the power transmission system so as to extend the operating range without such resonance problem.

In either of the countermeasures, however, the existing power transmission system connects the engine and the output shaft under a rigid condition. Thus, it is impossible to obviate completely the resonance point for a selected range of RPM of the engines. As a result, a red mark is normally provided on a scale of a tachometer of the conventional marine engine so as to indicate the dangerous speed range in terms of engine RPM. And, such an instruction is given as the engine operating condition should pass the red mark zone as swiftly as possible. In this respect, needless to say that the narrower this red mark zone becomes, the better the stabilization of the operating condition becomes.

SUMMARY OF THE INVENTION

It is, therefore, an object of the present invention to provide such a resonance preventive system for use with a power transmission system of an internal combustion engine which is free of the above drawbacks.

Another object of the present invention is to provide a resonance preventive system of the above type, in which an element is disposed in an oscillatory portion of the power transmission system to have its torsional rigidity varied momentarily in response to the variation in the RPM and/or the applied load of the engine so that the transmission may be always held at an oscillatory safe condition.

According to a major aspect of the present invention, a resonance preventive system for use with a power transmission system of an internal combustion engine is proposed, which comprises a fluid coupling of variable torsional rigidity type disposed midway of the power transmission system, detecting means for detecting operating conditions of the engine in terms of its engine RPM and/or its applied load for producting a signal indicative of the operating conditions, and control means responsive to the signal for supplying a fluid control signal, which has its pressure and flow rate varied in accordance with the engine operating conditions, to the fluid coupling so that the resonance point of the power transmission system may be shifted in response to the variation in the engine operating conditions.

BRIEF DESCRIPTION OF THE DRAWINGS

Other objects and advantages of the present invention will be apparent from the following description taken in conjunction with the accompanying drawings, in which.

DESCRIPTION OF THE PREFERRED EMBODIMENT

Figure 1:
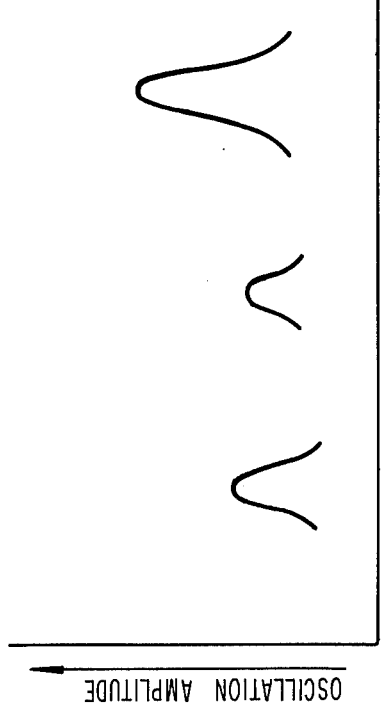
FIG. 1 is a graphical presentation showing a representative oscillatory characteristic of a power transmission system of a 6-cylinder marine engine of internal combustion type.

Typical oscillatory characteristics are shown in FIG. 1 for a power transmission system of a 6-cylinder marine engine. In FIG. 1, an amplitude is plotted against the engine speed in RPM. The wave forms as shown correspond to one-node tertiary, one-node sixth and two-node sixth oscillations A, B and C with considerable amplitudes, respectively. These oscillations A, B, and C should be sufficiently shifted or located apart from the operating range of the marine engine, as has been explained beforehand.

Description will now be made on one embodiment of the present invention, with reference to FIG. 2.

Figure 2:
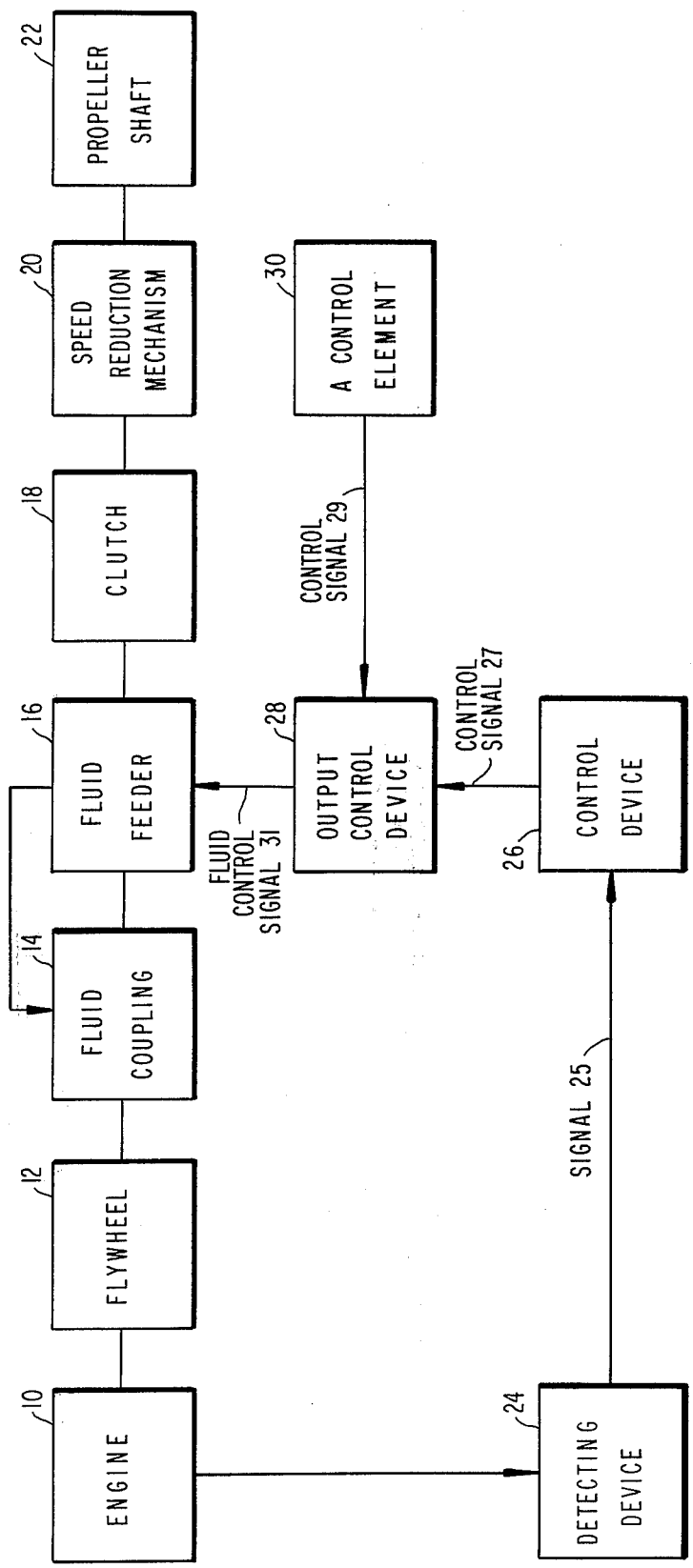
FIG. 2 is a flow chart showing a power transmission system into which a resonance preventive system according to the present invention is incorporated.

The power transmission system, into which the present resonance preventive system is incorporated, comprises as customary in coupled fashion, an internal combustion engine 10, a flywheel 12, a fluid coupling 14 with variable torsional rigidity, a fluid feeder 16, a clutch 18, a speed reduction mechanism 20, and a propeller shaft 22, in this sequence from left to right of FIG. 2. The resonance preventive system according to the present invention is, on the other hand, composed of a detecting device 24 which detects operation conditions of the engine in terms of its rotative shaft speed in RPM and/or its applied load for producing a signal 25 indicative of the operating conditions, a control device 26 responsive to the signal 25 of the detecting device for producing a control signal 27, an output control device 28 having a predetermined control element 30 providing a control signal 29 thereto and also responsive to the control signal 27 for producing a fluid control signal 31, the fluid feeder 16 responsive to the fluid control signal for passing the same therethrough and the fluid coupling 14 responsive to the fluid control signal 31 through the fluid feeder to that the resonance point of the power transmission system may be shifted in response to the variation in the engine operating conditions.

When, in operation, the variation in the number of revolutions and the load of the engine is detected by the detecting device 24, the output signal 25 indicative of the operating conditions is then introduced as an input control signal into the control device 26 and subsequently into the output control device 28, from which a fluid control signal 31 having its pressure and flow rate varied properly in accordance with the engine operating conditions is extracted as an output. This fluid control signal 31 is then introduced through the fluid feeder into the fluid coupling so as to shift the resonance point in accordance with the variation in the number of rotation and the load of the engine.

The number of revolutions of the engine can be detected with use of any contactless detector such as of DC generator, reflection or current type. A pressure reducing valve or a flow regulator may be used as the output control device 28 so as to supply a control fluid of variable pressure and flow rate to the fluid coupling 16.

Figure 3:
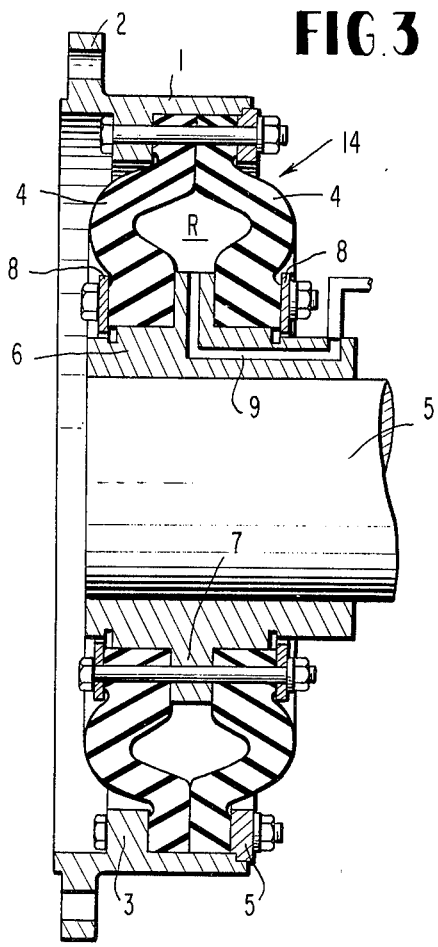
FIG. 3 is a longitudinal section showing a fluid coupling of variable torsional rigidity type to be incorporated into the resonance preventive system of FIG. 2.

The fluid coupling 16 to be used in the present system is exemplified in FIG. 3. As shown, an annular casing 1 which may be coupled to the flywheel is provided with flanges 2 and 3. Annular rubber elements 4 are secured to the inside of the casing 1 by means of an outer clamp ring 5, which is fastened to the flange 3 with bolts and nuts. The rubber elements 4 on their inside, engage respective sides of a flange 7 of a hub 6 and are secured to the hub 6 by means of inner clamp rings 8 and combinations of bolts and nuts. Hub 6 may be secured to shaft 5 leading to clutch 18 by means (not shown). Between the hub and the rubber elements 4, there is formed a space R into which a fluid supply passage 9 opens. This fluid supply passage 9 has its other end communicating with the fluid feeder. Incidentally, the rubber elements 4 are of the type in which tire cords are accommodated.

As has been described in the above, according to the present invention, the resonance point of the power transmission can be shifted in response to the variation in RPM and the load of the internal combustion engine. Thus, this resonance point can be obviated under some operating conditions of the engine. As a result, the power transmission system can be brought into operation irrespective of the red mark zone of the tachometer of the engine. Since, moreover, this red mark zone can be highly restricted, the engine can be made to run without any difficulty.

The present resonance preventive system can cope with the undesirable oscillations of the transmission system, if any. Thus, the degree of freedom in design of the transmission can be extended accordingly. Since, moreover, the transmission mechanism can be brought into safe and proper operation for any operating condition of the engine, troubles such as breakage of gears of the reduction mechanism in the transmission system, which might otherwise take place in the conventional system, can be eliminated to offer an excellent countermeasure for the possible marine disaster.

Figure 4:
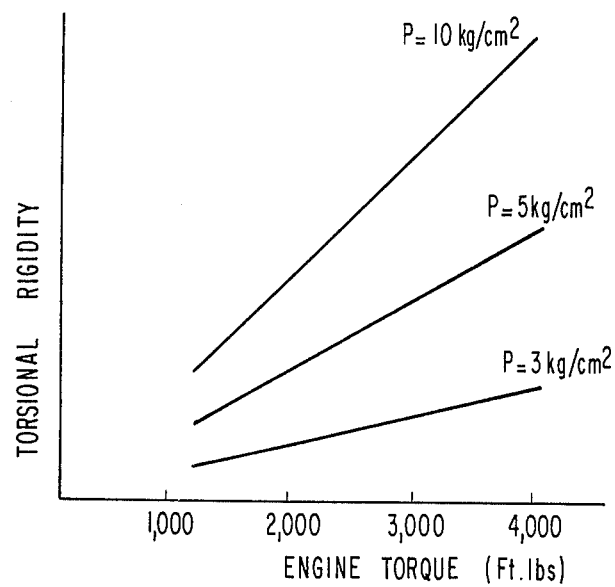
FIG. 4 is a graphical presentation showing the torsional rigidity increased in accordance with the present invention.

Turning now to FIG. 4, in which the relationship between the fluid supply pressure to the fluid coupling and the torsional rigidity of the power transmission system is illustrated by way of example only. In FIG. 4, the torsional rigidity is plotted in terms of the obtained angle of torsion against the engine torque, using the fluid supply pressure as a parameter. It will be apparent from FIG. 4 that more than 2 times the torsional rigidity can be obtained by changing the fluid pressure from 3 kg/cm$^2$ to 10 kg/cm$^2$.

Figure 5A:
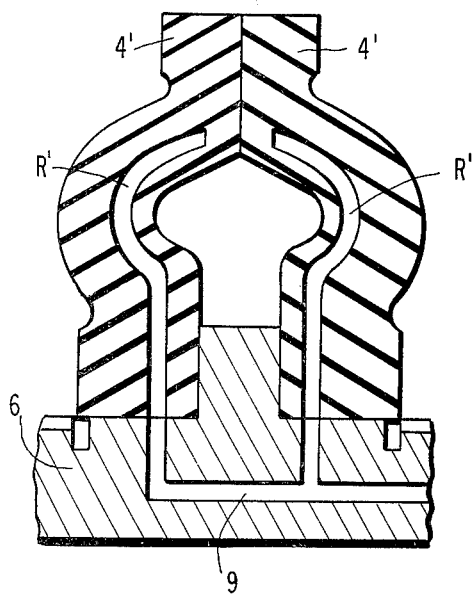
FIGS. 5a and 5b are enlarged longitudinal sections showing respective modifications of the fluid coupling of FIG. 3.
Figure 5B:
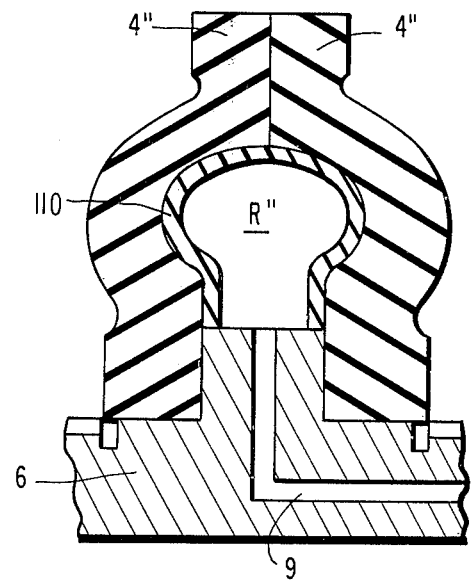

FIGS. 5a and 5b show other embodiments of the fluid coupling, in which like elements carry like numbers to the first embodiment, the rubber elements are modified. In the modification of FIG. 5a, a chamber R' is formed inside of the rubber elements 4'. In another modification of FIG. 5b, on the other hand, a flexible pipe 110 is adhered to the inner surface of the rubber elements 4'' so as to form a chamber R''. The relative position or the chamber to the rubber element should not be limited to the inside nor inner surface thereof, but may be further modified, for example, located on the outer surface of the rubber element, without departing from the concepts and spirit of the present invention.

What is claimed is:

1. A resonance preventive system for use with a power transmission system of an internal combustion engine, said resonance preventive system comprising:
   a fluid coupling with variable torsional rigidity disposed midway of the power transmission system between input and output transmission system elements, said coupling comprising a hollow annular rubber member means fixedly coupled between said input and output elements and forming a fluid pressure chamber therebetween;
   means for detecting the rotative speed and/or the applied load on said engine and for producing a signal indicative thereof; and
   control means responsive to said signal for supplying a control fluid whose pressure and flow rate varies in accordance with variance of said signal to said fluid coupling chamber to vary the torsional rigidity of said annular rubber member means to shift the resonance point of the power transmission system.

2. The resonance preventive system as claimed in claim 1, wherein said power transmission system comprises in order from said engine, a fly wheel, a clutch and a speed reduction mechanism, said fluid coupling is positioned between said fly wheel and said clutch, said control means comprises a fluid feeder positioned within said power transmission system intermediate said fluid coupling and said clutch, conduit means coupling said fluid feeder to said fluid coupling, a first control device, a second control device, said first control device receiving an input control signal from said detecting device and feeding an output signal to said second control device, a preset control element feeding a control signal to said second control device, and said second control device feeding a fluid control signal to said fluid feeder for controlling fluid feed from feeder to said fluid coupling.

3. The resonance preventive system as claimed in claim 1, wherein said annular rubber member means comprises a pair of annular rubber elements and wherein a hub is of a diameter less than that of said annular casing, and means secure said annular rubber elements at their peripheries respectively to said casing and said hub, means mount said hub and said casing to respective elements of said power transmission system for rotation under torisonal restraint provided by said rubber elements, at least one of said annular elements defines said fluid pressure chamber and said control fluid is supplied to said chamber, whereby, said fluid coupling has its torsional rigidity varied depending upon the pressure of the fluid within said chamber.

4. The resonance preventive system as claimed in claim 3, wherein said means forming said fluid chamber within said rubber elements comprise at least one annular passage formed within at least one of said rubber elements with said passage lying intermediate of said annular casing and said hub.

5. The resonance preventive system as claimed in claim 3, wherein said fluid chamber is formed by the opposed surfaces of said annular rubber elements intermediate of said annular casing and said hub.

6. The resonance preventive system as claimed in claim 5, further comprising a flexible pipe carried between the opposed surfaces of said rubber elements with said pipe forming a fluid chamber internal of said elements.

* * * * *